US008775718B2

(12) United States Patent
Kanevsky et al.

(10) Patent No.: US 8,775,718 B2
(45) Date of Patent: Jul. 8, 2014

(54) USE OF RDMA TO ACCESS NON-VOLATILE SOLID-STATE MEMORY IN A NETWORK STORAGE SYSTEM

(75) Inventors: Arkady Kanevsky, Swampscott, MA (US); Steve C. Miller, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 552 days.

(21) Appl. No.: 12/165,831

(22) Filed: Jul. 1, 2008

(65) Prior Publication Data

US 2009/0292861 A1 Nov. 26, 2009

Related U.S. Application Data

(60) Provisional application No. 61/055,906, filed on May 23, 2008.

(51) Int. Cl.

| G06F 12/00 | (2006.01) |
|---|---|
| G06F 13/00 | (2006.01) |
| G06F 13/28 | (2006.01) |
| H04L 12/28 | (2006.01) |
| G06F 15/16 | (2006.01) |
| G06F 15/167 | (2006.01) |

(52) U.S. Cl.
USPC ............. 711/103; 370/389; 710/22; 709/212; 709/217; 709/203; 709/213; 709/214; 709/216; 709/218; 711/114

(58) Field of Classification Search
None
See application file for complete search history.

(56) References Cited

U.S. PATENT DOCUMENTS

| 6,119,205 A | 9/2000 | Wicki et al. |
|---|---|---|
| 6,725,337 B1 | 4/2004 | Tan et al. |
| 7,099,955 B1 * | 8/2006 | Gregg et al. ................... 709/238 |
| 7,203,796 B1 | 4/2007 | Muppalaneni et al. |
| 7,305,581 B2 | 12/2007 | Geng et al. |

(Continued)

FOREIGN PATENT DOCUMENTS

WO WO-2006/096442 A1 9/2006

OTHER PUBLICATIONS

International Search Report PCT/US2009/058256 dated May 3, 2010, pp. 1-3.
Written Opinion PCT/US2009/058256 dated May 3, 2010, pp. 1-4.

(Continued)

*Primary Examiner* — Sanjiv Shah
*Assistant Examiner* — Marwan Ayash
(74) *Attorney, Agent, or Firm* — Perkins Coie LLP

(57) ABSTRACT

A network storage controller uses a non-volatile solid-state memory (NVSSM) subsystem which includes raw flash memory as stable storage for data, and uses remote direct memory access (RDMA) to access the NVSSM subsystem, including to access the flash memory. Storage of data in the NVSSM subsystem is controlled by an external storage operating system in the storage controller. The storage operating system uses scatter-gather lists to specify the RDMA read and write operations. Multiple client-initiated reads or writes can be combined in the storage controller into a single RDMA read or write, respectively, which can then be decomposed and executed as multiple reads or writes, respectively, in the NVSSM subsystem. Memory accesses generated by a single RDMA read or write may be directed to different memory devices in the NVSSM subsystem, which may include different forms of non-volatile solid-state memory.

21 Claims, 15 Drawing Sheets

(56) References Cited

U.S. PATENT DOCUMENTS

| | | | |
|---|---|---|---|
| 7,610,348 B2* | 10/2009 | Kisley et al. | 709/212 |
| 7,624,156 B1* | 11/2009 | Hefty et al. | 709/213 |
| 2006/0020598 A1 | 1/2006 | Shoolman et al. | |
| 2006/0236063 A1 | 10/2006 | Hausauer et al. | |
| 2006/0248088 A1* | 11/2006 | Kazar et al. | 707/10 |
| 2007/0078940 A1* | 4/2007 | Fineberg et al. | 709/216 |
| 2007/0162641 A1 | 7/2007 | Oztaskin et al. | |
| 2007/0208820 A1 | 9/2007 | Makhervaks et al. | |
| 2007/0282967 A1* | 12/2007 | Fineberg et al. | 709/214 |
| 2007/0288921 A1 | 12/2007 | King et al. | |
| 2007/0300008 A1 | 12/2007 | Rogers et al. | |
| 2008/0148281 A1 | 6/2008 | Magro et al. | |
| 2008/0183882 A1 | 7/2008 | Flynn et al. | |

OTHER PUBLICATIONS

Gal, E. and Toledo, S. 2005. Algorithms and data structures for flash memories. *ACM Comput. Surv.* 37, 2 (Jun. 2005), 138-163.

EMC Press Release, "EMC²® Where Information Lives®, EMC in Major Storage Performance Breakthrough; First with Enterprise-Ready Solid State Flash Drive Technology", http://www.prnewswire.com/mnr/emc/31368, 3 pages, Webcast: David Donatelli Discusses EMC's Latest Storage Innovation (Jan. 14, 2008).

EMC Data Sheet, "EMC Symmetrix DMX Series, The World's Most Trusted Storage Platform", 8 pages (publication date unknown).

Rabin, T. and Ben-Or, M. 1989. Verifiable secret sharing and multiparty protocols with honest majority. In *Proceedings of the Twenty-First Annual ACM Symposium on theory of Computing* (Seattle, Washington, United States, May 14-17, 1989). D. S. Johnson, Ed. STOC '89. ACM, New York, NY, 73-85. DOI= http://doi.acm.org/10.1145/73007.

Ellard, D. and Megquier, J. 2005. DISP: Practical, efficient, secure and fault-tolerant distributed data storage. *Trans. Storage* 1, 1 (Feb. 2005), 71-94. DOI= http://doi.acm.org/10.1145/1044956.1044960.

Kevin Closson; http//kevinclosson.wordpress.com/Two Terabytes of Flash Solid State Disk Anyone?; Sep. 17, 2008; 3 pages.

RamSan-500 Details; Texas Memory Systems—Products—RamSan-500 Solid State Disk; www.superssd.com/products/ramsan-500; 2 pages; Apr. 15, 2008.

SystemFabricMem; www.systemfabricworks.com/fabricmem.htm; Apr. 30, 2008; 3 pages.

Co-pending U.S. Appl. No. 12/239,092, filed Sep. 26, 2008.

International Search Report PCT/US2009/044908 dated Dec. 24, 2009, pp. 1-3.

Written Opinion PCT/US2009/044908 dated Dec. 24, 2009 pp. 1-4.

Non-Final Office Action Mailed Nov. 21, 2011 in Co-Pending U.S. Appl. No. 12/239,092 of Kanevsky, A., et al., filed Sep. 26, 2008.

Final Office Action Mailed Apr. 11, 2012 in Co-Pending U.S. Appl. No. 12/239,092 of Kanevsky, A., et al., filed Sep. 26, 2008.

Ellard, D. and Megquier, J. 2005. DISP: Practical, efficient, secure and fault-tolerant distributed data storage Transactions Storage vol. 1, No. 1 (Feb. 2005), 71-94. Dec. 2004, 71-94 http://doi.acm.org/10.1145/1044956.1044960.

Advisory Action Mailed Aug. 6, 2012 in Co-Pending U.S. Appl. No. 12/239,092 of Kanevsky, A., et al., filed Sep. 26, 2008.

* cited by examiner

USE OF RDMA TO ACCESS NON-VOLATILE SOLID-STATE MEMORY IN A NETWORK STORAGE SYSTEM This application claims the benefit of Provisional U.S. Patent application No. 61/055,906 of A. Kanevsky et al., filed on May 23, 2008, which is incorporated herein by reference.

FIELD OF THE INVENTION

At least one embodiment of the present invention pertains to network storage systems, and more particularly, to the use of remote direct memory access (RDMA) to access non-volatile solid-state memory in a network storage system.

BACKGROUND

A storage server is a type of network storage controller which is a special purpose data processing system used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive disks (RAID)). A storage server also typically includes internal memory that is used as a buffer cache, to speed up the reading and writing of data from and to (respectively) the main mass storage system. In conventional storage servers, this buffer cache typically is implemented the form of dynamic random access memory (DRAM).

It is desirable to improve the performance of any data processing system. In the case of a storage server, one way to accomplish this is by reducing the latency and increasing the random access throughput associated with accessing the storage server's main mass storage subsystem. In this regard, flash memory, particularly NAND flash memory, has certain very desirable properties. Flash memory generally has a very fast read access speed compared to that of conventional disk drives. Also, flash memory is substantially cheaper than conventional DRAM and is not volatile like DRAM.

However, flash memory also has certain characteristics that make it unfeasible simply to replace the DRAM or disk drives of a storage server with flash memory. In particular, a conventional flash memory is typically accessed by a host through a serial command interface. Because such an interface allows the flash memory only to receive one command (e.g., a read or write) at a time from the host, it can become a bottleneck in applications where low latency and/or high throughput is needed.

In addition, while flash memory generally has superior read performance compared to conventional disk drives, its write performance is generally not as good, especially for random writes. One reason is that each time a unit of flash memory is written, it must first be erased, which adds latency to write operations. Furthermore, flash memory tends to wear out after a finite number of erase operations.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
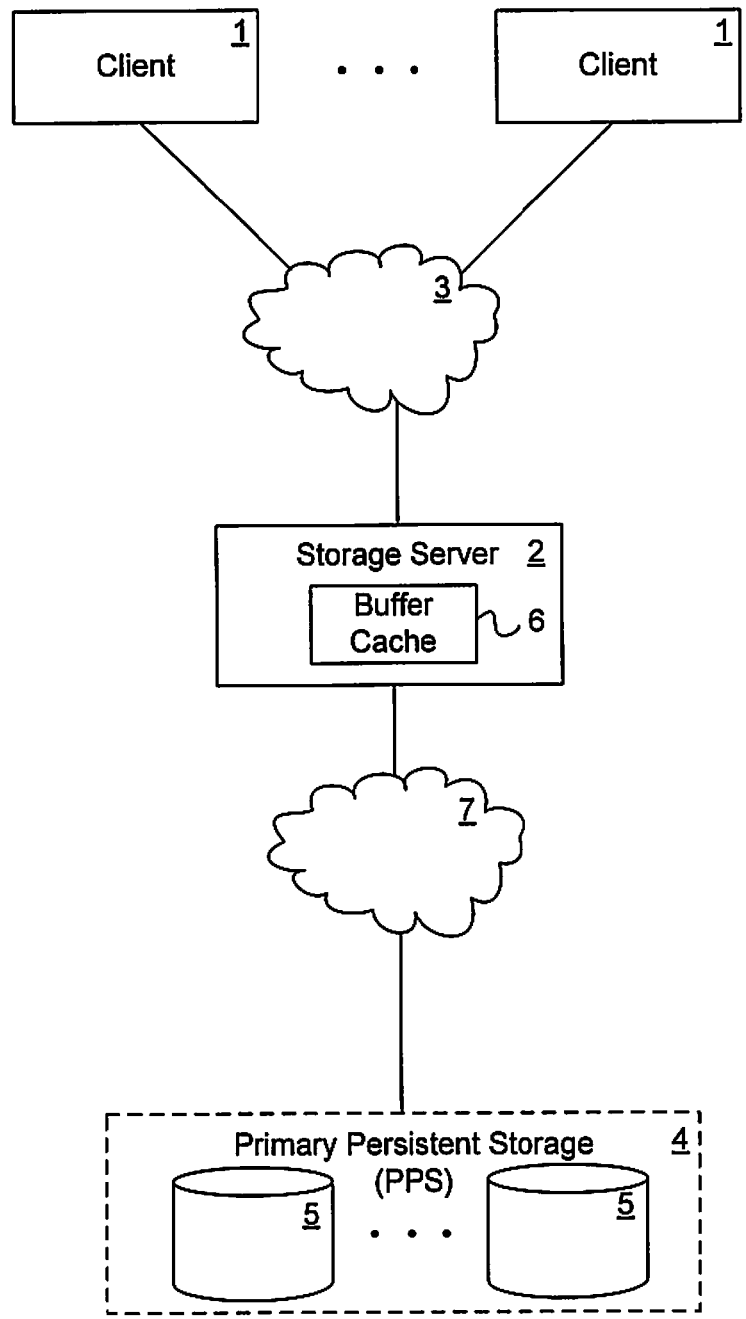
FIG. 1 illustrates a network storage system in which the present invention can be implemented.

A method and apparatus for facilitating the use of non-volatile solid-state memory such as flash memory in a network storage system are described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment; however, neither are such occurrences mutually exclusive necessarily.

As described in greater detail below, a network storage controller such as a storage server uses a non-volatile solid-state memory (NVSSM) subsystem which includes raw flash memory to store data persistently. Some examples of non-volatile solid-state memory are flash memory and battery-backed DRAM. The NVSSM subsystem can be used as, for example, the primary persistent storage facility of the storage server and/or the buffer cache of a storage server.

To avoid the bottleneck normally associated with accessing flash memory through a conventional serial interface, remote direct memory access (RDMA) controlled by the storage server is used to move data to and from the NVSSM subsystem, rather than a conventional serial interface. The techniques introduced here allow the advantages of flash memory to be obtained without incurring the latency and loss of throughput normally associated with a serial command interface between the host and the flash memory.

Both read and write accesses to the NVSSM subsystem are controlled by the storage operating system in the storage server, which in certain embodiments includes a log structured, write out-of-place data layout engine. The data layout engine generates scatter-gather lists to specify the RDMA read and write operations. At a lower-level, all read and write access to the NVSSM subsystem can be controlled from an RDMA controller in the storage server, under the direction of the storage operating system in the storage server.

The technique introduced here supports compound RDMA commands; that is, one or more client-initiated operations such as reads or writes can be combined by the storage server into a single RDMA read or write, respectively, which upon receipt at the NVSSM subsystem is decomposed and executed as multiple parallel or sequential reads or writes, respectively. The multiple reads or writes executed at the NVSSM subsystem can be directed to different memory devices in the NVSSM subsystem, which may include different types of memory. For example, in certain embodiments, user data and associated resiliency metadata (e.g., RAID data and checksums) are stored in flash memory in the NVSSM subsystem, while associated file system metadata are stored in non-volatile DRAM in the NVSSM subsystem. This approach allows updates to file system metadata to be made without having to incur the cost of erasing flash blocks, which is beneficial since file system metadata tends to be frequently updated. Further, when a sequence of RDMA operations is sent by the storage server to the NVSSM subsystem, completion status may be suppressed for all of the individual RDMA operations except the last one.

As noted above, in certain embodiments the NVSSM subsystem includes "raw" flash memory, and the storage of data in the NVSSM subsystem is controlled by an external (relative to the flash device), log structured data layout engine of a storage server which employs a write anywhere storage policy. By "raw", what is meant is a memory device that does not have any on-board data layout engine (in contrast with conventional flash SSDs). A "data layout engine" is defined herein as any element (implemented in software and/or hardware) that decides where to store data and locates data that is already stored. "Log structured", as the term is defined herein, means that the data layout engine lays out its write patterns in a generally sequential fashion (similar to a log) and performs all writes to free blocks.

The flash memory can be used as the primary persistent storage of a storage server, or as the buffer cache of a storage server, or both (or as a portion thereof). Further, the flash memory can be made accessible to multiple storage servers, such as in a storage cluster.

The embodiments described herein relate to a network storage server, merely as an example, to facilitate description of the techniques being introduced. It will be recognized, however, that the techniques introduced here can be applied to other types of data processing systems as well.

In some embodiments, the external data layout engine in the storage server implements a "write out-of-place" (also called "write anywhere") policy when writing data to the flash memory (and elsewhere), as described further below. In this context, writing out-of-place means that whenever a logical data block is modified, that data block, as modified, is written to a new physical storage location, rather than overwriting it in place. (Note that a "logical data block" managed by the data layout engine in this context is not the same as a physical "block" of flash memory. A logical block is a virtualization of physical storage space, which does not necessarily correspond in size to a block of flash memory. In one embodiment, each logical data block managed by the data layout engine is 4 kB, whereas each physical block of flash memory is much larger, e.g., 128 kB.) Because the flash memory does not have any internal data layout engine, the external write-out-of-place data layout engine of the storage server can write data to any free location in flash memory. Consequently, the external write-out-of-place data layout engine can write modified data to a smaller number of erase blocks than if it had to rewrite the data in place, which helps to reduce wear on flash devices.

Refer now to FIG. 1, which shows a network storage system in which the present invention can be implemented. In FIG. 1, a network storage server 2 is coupled to a primary persistent storage (PPS) subsystem 4 that includes multiple non-volatile mass storage devices, and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

The storage server 2 manages storage of data in the PPS subsystem 4. The storage server 2 receives and responds to various read requests and write requests from the clients 1, directed to data stored in, or to be stored in, the storage subsystem 4. The storage server 2 communicates with the PPS subsystem 4 over an interconnect 7. The interconnect 7 may support any of various types communication protocols, such as Ethernet iWarp, Fibre Channel Virtual Interface (FCVI), InfiniBand, Peripheral Component Interconnect express (PCIe), or the like.

In accordance with the techniques introduced here, the mass storage devices 5 in the PPS subsystem 4 can be non-volatile solid-state memory, including flash memory. Alternatively, they can be, for example, conventional magnetic or optical disks or tape drives. The mass storage devices 5 can be organized as one or more Redundant Array of Inexpensive Disk/Device (RAID) groups, in which case the storage server 2 accesses the PPS subsystem 4 using one or more well-known RAID algorithms. The storage server 2 also includes an internal buffer cache 6, which can be implemented as DRAM, for example, or, in accordance with the techniques introduced here, the buffer cache 6 can be implemented as non-volatile solid-state memory, including flash memory. It will be recognized that the techniques introduced here can also be used to access flash memory used for other purposes.

The storage server 2 may provide file-level data access service to clients 1, such as commonly done by a storage server in a network attached storage (NAS) environment (i.e., a "filer"), or block-level data access service such as commonly done by a storage server in a storage area network (SAN) environment; or, it may be capable of providing both file-level data access service and block-level data access service. Further, although the storage server 2 is illustrated as a single unit in FIG. 1, the storage server 2 can have a distributed architecture. For example, the storage server 2 can include a physically separate N-(network-) blade and D-(data-) blade that communicate over an interconnect (not shown).

The techniques introduced here can be used to enable the PPS subsystem 4 to be implemented with raw flash memory. In certain embodiments, the flash memory is accessible to multiple storage servers, such as in a cluster failover configuration.

FIG. 2 is a high-level block diagram showing an example of the architecture of the storage server 2 and the NVSSM subsystem, according to one embodiment. The storage server 2 includes one or more processors 21 and memory 22 coupled to a interconnect 23. The interconnect 23 shown in FIG. 2 is an abstraction that represents any one or more separate physical buses, point-to-point connections, or both connected by appropriate bridges, adapters, or controllers. The interconnect 23, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, an Institute of Electrical and Electronics Engineers (IEEE) standard 1394 bus (sometimes referred to as "Firewire"), or any combination of such interconnects.

The processor(s) 21 include central processing units (CPUs) of the storage server 2 and, thus, control the overall operation of the storage server 2. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 is, or includes, the main memory of the storage server 2. The memory 22 represents any form of random access memory (RAM), read-only memory (ROM), flash memory, or the like, or a combination of such devices. In use, the memory 22 may contain, among other things, at least a portion of the storage operating system 40 of the storage server 2. The memory 22 can also include the buffer cache 6 of the storage server 2, as shown.

Also connected to the processor(s) 21 through the interconnect 23 are a network adapter 24 and a storage adapter 25. The network adapter 24 provides the storage server 2 with the ability to communicate with remote devices, such as clients 1, over a network 3 and may be, for example, an Ethernet, Fibre Channel, ATM, or Infiniband adapter. The storage adapter 25 allows the storage server 2 to access PPS subsystem 4, which as shown may be implemented as a NVSSM subsystem 26. In embodiments where the PPS subsystem 4 is implemented using more traditional mass storage, such as magnetic disks, the storage adapter 25 may be, for example, a Fibre Channel adapter or a SCSI adapter. In certain embodiments, the network adapter 24 and the storage adapter 25 may be the same physical device.

To facilitate description, it is henceforth assumed that the PPS subsystem 4 is implemented as a NVSSM subsystem 26, i.e., with non-volatile solid-state memory. In such an embodiment, the storage adapter 25 is or includes an RDMA controller. Thus, storage adapter 25 is henceforth referred to as the "host RDMA controller" 25.

The RDMA techniques described herein can be used to transfer data between memory within the storage server 2 (e.g., buffer cache 6) and the NVSSM subsystem 26. Host RDMA controller 25 includes a memory map of all of the memory in the NVSSM subsystem 26. The memory in the NVSSM subsystem 26 includes flash memory 27 as well as some form of non-volatile DRAM 28 (e.g., battery backed DRAM). Non-volatile DRAM 28 is used for storing filesystem metadata associated with data stored in the flash memory 27, to avoid the need to erase flash blocks due to updates of such frequently updated metadata. Filesystem metadata can include, for example, a tree structure of objects, such as files and directories, where the metadata of each of these objects recursively has the metadata of the filesystem as if it were rooted at that object. In addition, filesystem metadata can include the names, sizes, ownership, access privileges, etc. for those objects.

Figure 2A:
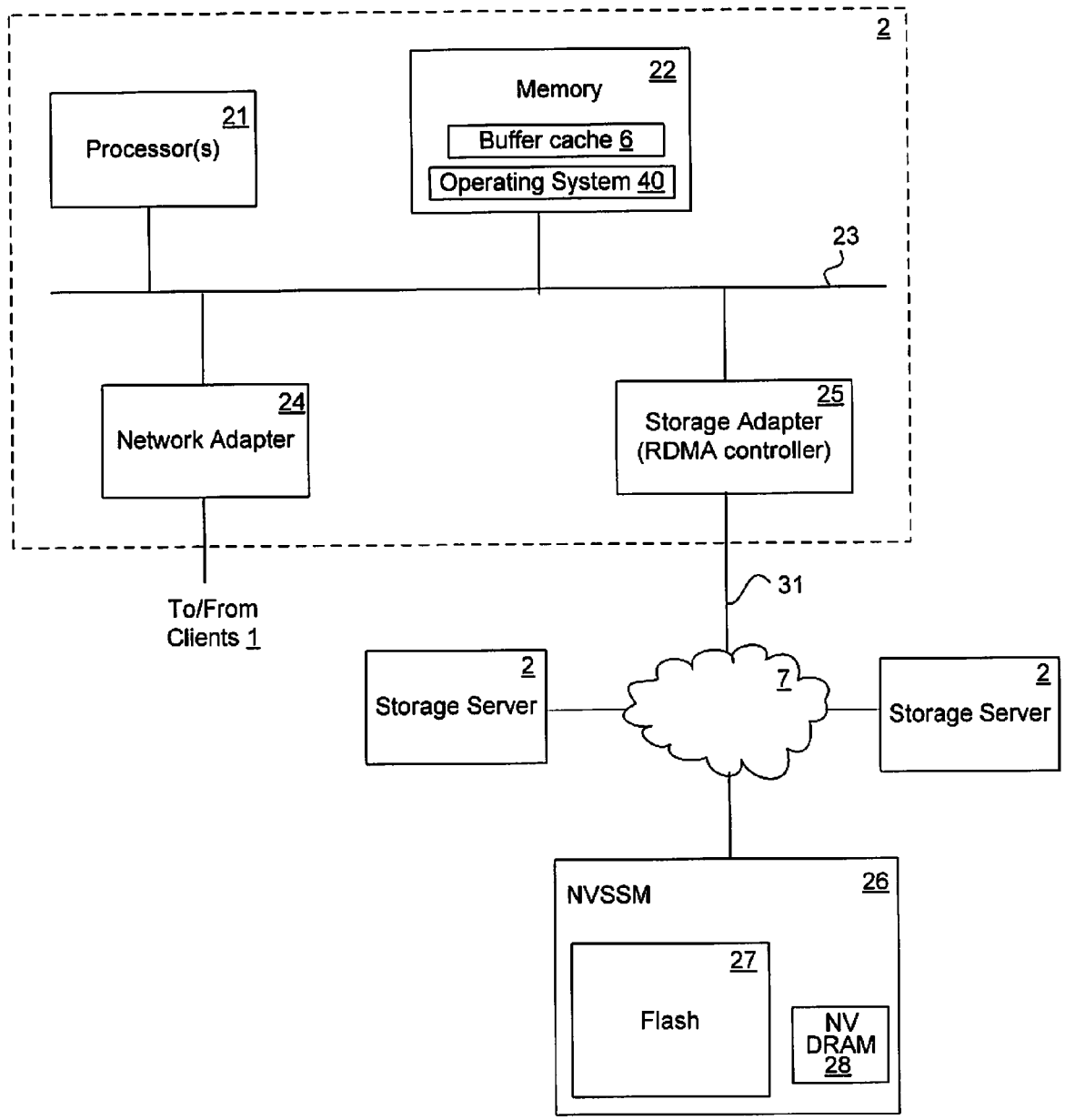
FIG. 2A is a high-level block diagram showing an example of the architecture of a storage server and a nonvolatile solid-state memory (NVSSM) subsystem, according to one embodiment.
Figure 2B:
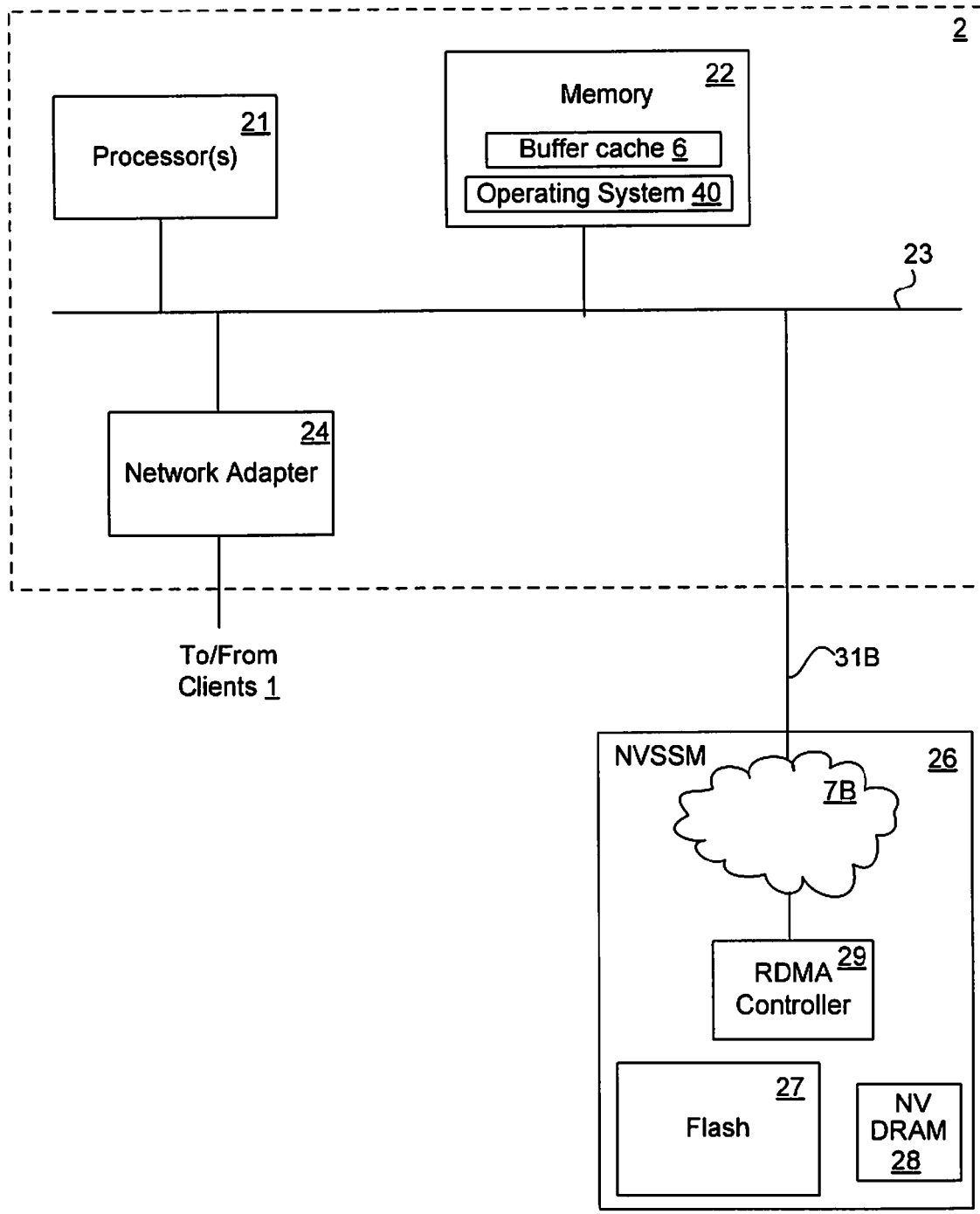
FIG. 2B is a high-level block diagram showing an example of the architecture of a storage server and a NVSSM subsystem, according to another embodiment.

As can be seen from FIG. 2A, multiple storage servers 2 can access the NVSSM subsystem 26 through the external interconnect 7. FIG. 2B shows an alternative embodiment, in which the NVSSM subsystem 26 includes an internal fabric 7B, which is directly coupled to the interconnect 23 in the storage server 2. In one embodiment, fabric 7B and interconnect 23 both implement PCIe protocols. In an embodiment according to FIG. 2B, the NVSSM subsystem 26 further includes an RDMA controller 29, hereinafter called the "storage RDMA controller" 29. Operation of the storage RDMA controller 29 is discussed further below.

Figure 3A:
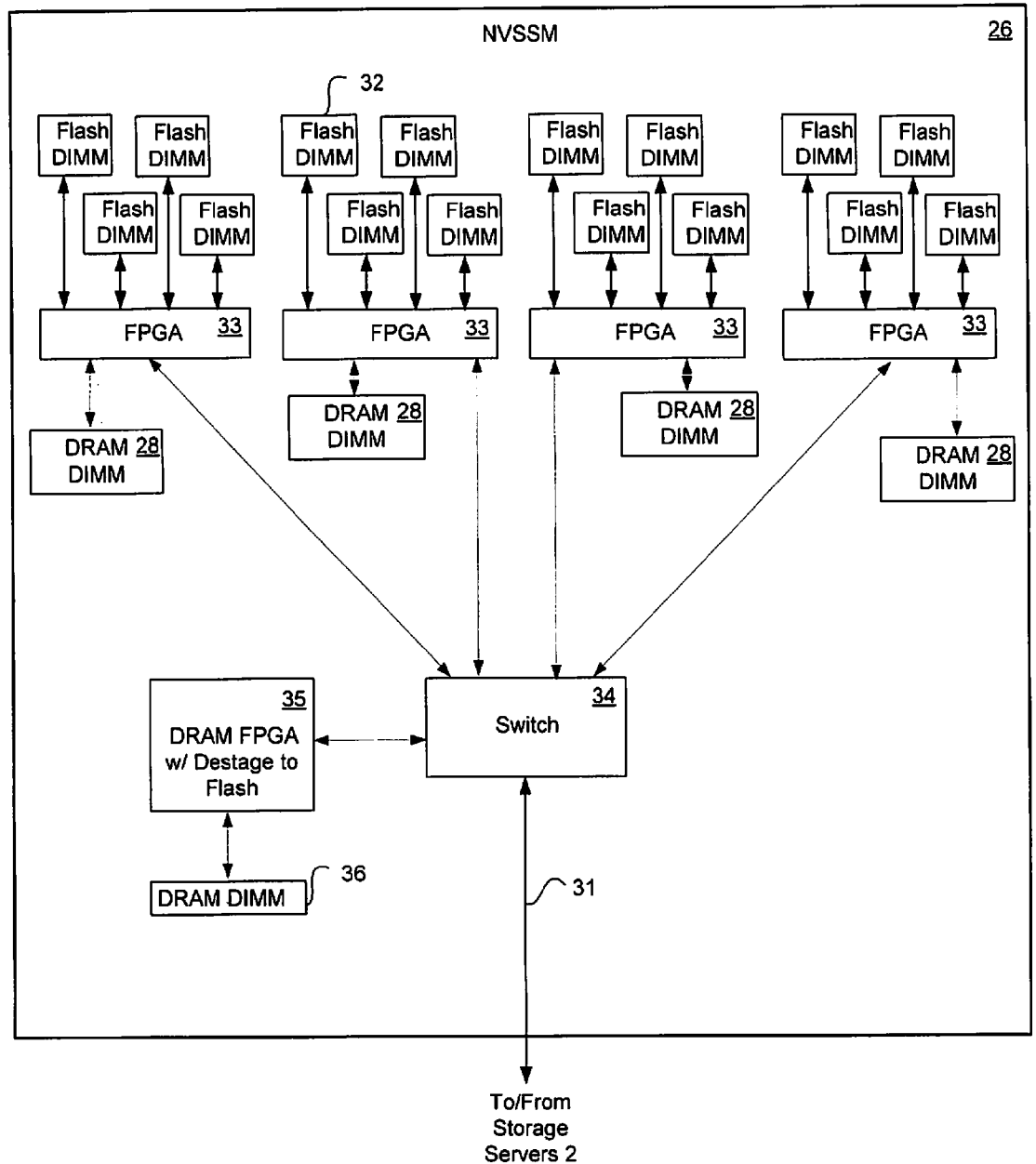
FIG. 3A shows an example of the architecture of the NVSSM subsystem corresponding to the embodiment of FIG. 2A.

FIG. 3A shows an example of the NVSSM subsystem 26 according to an embodiment of the invention corresponding to FIG. 2A. In the illustrated embodiment, the NVSSM subsystem 26 includes: a host interconnect 31, a number of NAND flash memory modules 32, and a number of flash controllers 33, shown as field programmable gate arrays (FPGAs). To facilitate description, the memory modules 32 are henceforth assumed to be DIMMs, although in another embodiment they could be a different type of memory module. In one embodiment, these components of the NVSSM subsystem 26 are implemented on a conventional substrate, such as a printed circuit board or add-in card.

In the basic operation of the NVSSM subsystem 26, data is scheduled into the NAND flash devices by a data layout engine that is external to the NVSSM subsystem 26, running on the storage server 2. An example of such a data layout engine is described below in connection with FIG. 4. To maintain data integrity, in addition to the typical error correction codes used in each NAND flash component, RAID data striping can be implemented (e.g., RAID-3, RAID-4, RAID-5, RAID-6, RAID-DP) across each flash controller 33.

In the illustrated embodiment, the NVSSM subsystem 26 also includes a switch 34, where each flash controller 33 is coupled to the interconnect 31 by the switch 34. In one embodiment, the host interconnect 31 is a PCI express (PCIe) bus and the switch 34 is a PCIe switch.

The NVSSM subsystem 26 further includes a separate battery backed DRAM DIMM coupled to each of the flash controllers 33, implementing the nonvolatile DRAM 28. The non-volatile DRAM 28 can be used to store file system metadata associated with data being stored in the flash devices 32.

In the illustrated embodiment, the NVSSM subsystem 26 also includes another non-volatile (e.g., battery-backed) DRAM buffer DIMM 36 coupled to the switch 34. DRAM buffer DIMM 36 is used for short-term storage of data to be staged from, or destaged to, the flash devices 32. A separate DRAM controller 35 (e.g., FPGA) is used to control the DRAM buffer DIMM 36 and to couple the DRAM buffer DIMM 36 to the switch 34.

In contrast with conventional SSDs, the flash controllers 33 do not implement any data layout engine; they simply interface the specific signaling requirements of the flash DIMMs 32 with those of the host interconnect 31. As such, the flash controllers 33 do not implement any data indirection or data address virtualization for purposes of accessing data in the flash memory. All of the usual functions of a data layout engine (e.g., determining where data should be stored, wear-leveling and locating stored data) are performed by an external data layout engine in the storage server 2. Due to the absence of a data layout engine within the NVSSM subsystem 26, the flash DIMMs 32 are referred to as "raw" flash memory.

Note that the external data layout engine may use knowledge of the specifics of data placement and wear leveling within flash memory. This knowledge and functionality could be implemented within a flash abstraction layer, which is external to the NVSSM subsystem 26 and which may or may not be a component of the external data layout engine.

Figure 3B:
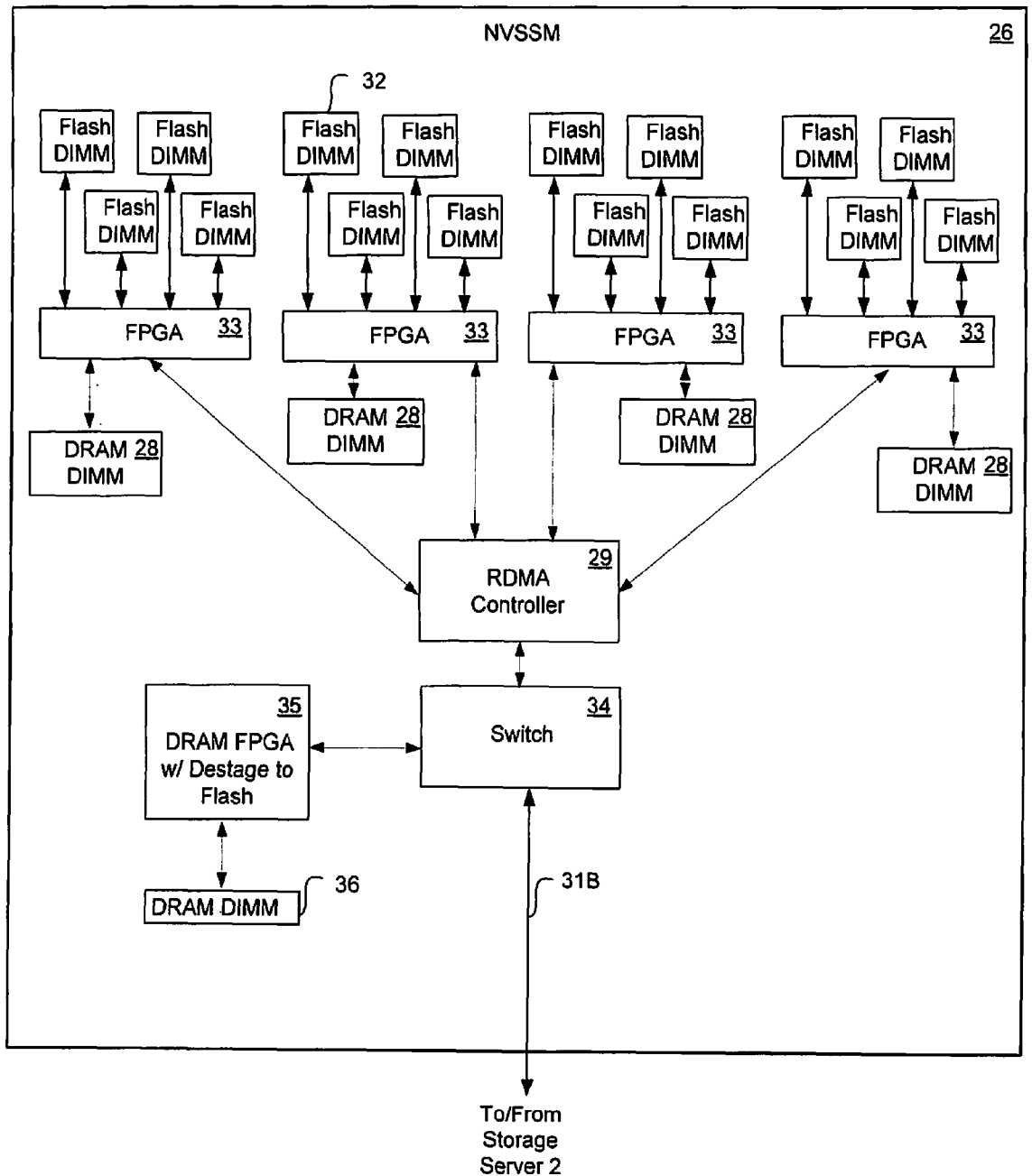
FIG. 3B shows an example of the architecture of the NVSSM subsystem corresponding to the embodiment of FIG. 2B.

FIG. 3B shows an example of the NVSSM subsystem 26 according to an embodiment of the invention corresponding to FIG. 2B. In the illustrated embodiment, the internal fabric 7 is implemented in the form of switch 34, which can be a PCIe switch, for example. The switch 34 is coupled directly to the internal interconnect 23 of the storage server 2. In this embodiment, the NVSSM subsystem 26 also includes RDMA controller 29, which is coupled between the switch 34 and each of the flash controllers 33. Operation of the RDMA controller 29 is discussed further below.

Figure 4:
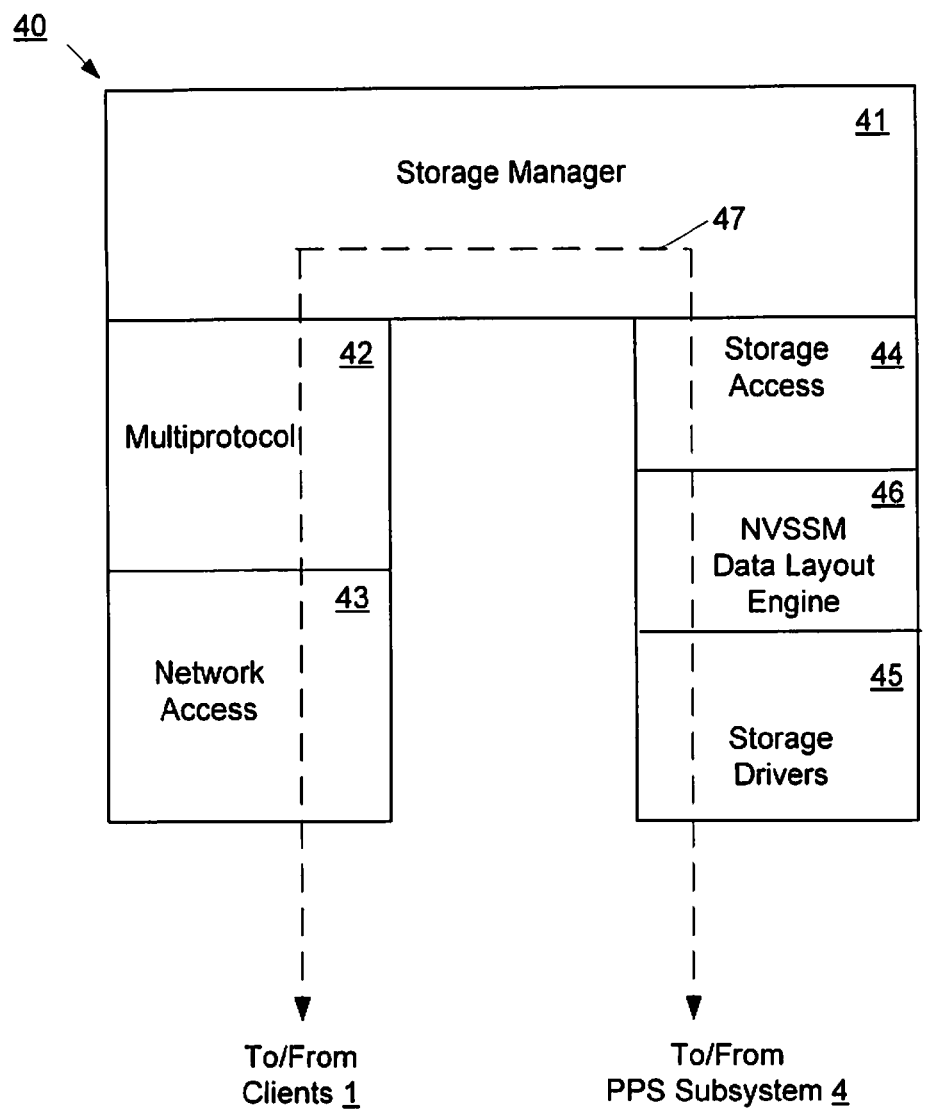
FIG. 4 shows an example of the architecture of a storage operating system in a storage server.

FIG. 4 schematically illustrates an example of a storage operating system that can be implemented in the storage server 2. As shown, the storage operating system 40 includes several software modules, or "layers". These layers include a storage manager 41, which is the core functional element of the storage operating system 50. The storage manager 41 is, in certain embodiments, software, which imposes a structure (e.g., a hierarchy) on the data stored in the PPS subsystem 4 (e.g., in the NVSSM subsystem 26), and which services read and write requests from clients 1. In one embodiment, the storage manager 41 manages a log structured file system and implements a "write out-of-place" (also called "write anywhere") policy when writing data to the PPS subsystem 4 (which can be implemented with raw flash memory in the manner described above). In other words, whenever a logical data block is modified, that logical data block, as modified, is written to a new physical storage location (physical block), rather than overwriting the data block in place. As mentioned above, this characteristic removes the need (associated with conventional flash memory) to erase and rewrite the entire block of flash anytime a portion of that block is modified. Note that some of these functions of the storage manager 41 can be delegated to the NVSSM data layout engine 46, as described below, for purposes of accessing the NVSSM subsystem 26.

Logically "under" the storage manager 41, to allow the storage server 2 to communicate over the network 3 (e.g., with clients 1), the storage operating system 40 also includes a multiprotocol layer 42 and a network access layer 43. The multiprotocol 42 layer implements various higher-level network protocols, such as Network File System (NFS), Common Internet File System (CIFS), Hypertext Transfer Protocol (HTTP), user datagram protocol (UDP) and Transmission Control Protocol/Internet Protocol (TCP/IP). The network access layer 43 includes one or more network drivers that implement one or more lower-level protocols to communicate over the network 3, such as Ethernet, Fibre Channel, InfiniBand or Internet small computer system interface (iSCSI).

Also logically under the storage manager 41, to allow the storage server 2 to communicate with the PPS subsystem 4, the storage operating system 40 includes a storage access layer 44, an associated storage driver layer 45, and an NVSSM data layout engine 46 disposed logically between the storage access layer 44 and the storage drivers 45. The storage access layer 44 implements a higher-level storage redundancy algorithm, such as RAID-3, RAID-4, RAID-5, RAID-6 or RAID-DP. The storage driver layer 45 implements a lower-level protocol.

The NVSSM data layout engine 46 can control RDMA operations and is responsible for determining the placement of data and flash wear-leveling within the NVSSM subsystem 26, as described further below. This functionality includes generating scatter-gather lists for RDMA operations performed on the NVSSM subsystem 26.

If the PPS subsystem 4 is implemented as the NVSSM subsystem 26, as described above, then the storage driver layer 45 controls the host RDMA controller 25 and implements a network protocol that supports conventional RDMA, such as FCVI, InfiniBand, or iWarp. On the other hand, if the PPS subsystem 4 is implemented using more traditional mass storage, such as magnetic disk drives, then the storage driver layer 45 can implement a storage device access protocol such as Fibre Channel Protocol (FCP) or small computer system interface (SCSI), for example. Also shown in FIG. 4 is the path 47 of data flow, through the storage operating system 40, associated with a read or write operation.

As noted above, both read access and write access to the NVSSM subsystem 26 are controlled by the storage operating system 40 in the storage server 2. The techniques introduced here use conventional RDMA techniques in order to allow efficient transfer of data to and from the NVSSM subsystem 26, for example, between the buffer cache 6 and the NVSSM subsystem 26. It can be assumed that the RDMA operations described herein are generally consistent with conventional RDMA standards, such as InfiniBand (InfiniBand Trade Association (IBTA)) or IETF iWarp (see, e.g.: RFC 5040, A Remote Direct Memory Access Protocol Specification, October 2007; RFC 5041, Direct Data Placement over Reliable Transports; RFC 5042, Direct Data Placement Protocol (DDP)/Remote Direct Memory Access Protocol (RDMAP) Security IETF proposed standard; RFC 5043, Stream Control Transmission Protocol (SCTP) Direct Data Placement (DDP) Adaptation; RFC 5044, Marker PDU Aligned Framing for TCP Specification; RFC 5045, Applicability of Remote Direct Memory Access Protocol (RDMA) and Direct Data Placement Protocol (DDP); RFC 4296, The Architecture of Direct Data Placement (DDP) and Remote Direct Memory Access (RDMA) on Internet Protocols; RFC 4297, Remote Direct Memory Access (RDMA) over IP Problem Statement).

In an embodiment according to FIGS. 2A and 3A, prior to normal operation (e.g., during initialization of the storage server 2), the host RDMA controller 25 registers at least a portion of the memory space in the NVSSM subsystem 26 with the NVSSM data layout engine 46 in the storage server 2. This involves the host RDMA controller 25 providing an RDMA Steering Tag (STag) identifying all of the memory in the NVSSM subsystem 26 to the NVSSM data layout engine 46. If multiple storage servers 2 are sharing the NVSSM subsystem 26, then each storage server 2 may have access to a different subset of memory in the NVSSM subsystem 26. In that case, the STag provided in each storage server 2 identifies the appropriate subset of NVSSM memory to be used by that storage server 2. In one embodiment, a protocol which is external to the NVSSM subsystem 26 is used between storage servers 2 to define which subset of memory is owned by which storage server 2. The details of such protocol are not germane to the techniques introduced here; any of various conventional network communication protocols could be used for that purpose. In another embodiment, some or all of memory of DIMM 28 is mapped to an RDMA STag for each storage server 2 and shared data stored in that memory is used to determine which subset of memory is owned by which storage server 2. Furthermore, in another embodiment, some or all of the NVSSM memory can be mapped to an STag of different storage servers 2 to be shared between them for read and write data accesses. Note that the algorithms for synchronization of memory accesses between storage servers 2 are not germane to the techniques being introduced here.

In the embodiment of FIGS. 2A and 3A, prior to normal operation (e.g., during initialization of the storage server 2), the host RDMA controller 25 registers at least a portion of storage server 2 memory space, for example buffer cache 6, with the storage operating system 40. This involves the host RDMA controller 25 providing an STag identifying the memory of storage server 2 to the storage operating system 40.

In the embodiment of FIGS. 2B and 3B, the storage RDMA controller 29 in the NVSSM subsystem 26 provides the STag for the NVSSM memory to the NVSSM data layout engine 46 in the storage server 2. In this embodiment the NVSSM subsystem 26 is only connected to a single storage server 2, so all NVSSM memory is mapped to that storage server and the Stag representing it is provided by the RDMA controller 29.

In the embodiment of FIGS. 2B and 3B, prior to normal operation (e.g., during initialization of the storage server 2), the host RDMA controller 29 registers at least a portion of storage server 2 memory space, for example a subset of buffer cache 6, with that storage operating system 40. This involves the NVSSM RDMA controller 29 providing an STag identifying the memory of storage server 2 to storage operating system 40 on that server.

During normal operation, the NVSSM data layout engine 46 (FIG. 4) generates scatter-gather lists to specify the RDMA read and write operations for transferring data to and from the NVSSM subsystem 26. A "scatter-gather list" is a pairing of a scatter list and a gather list. A scatter list or gather list is a list of entries (also called "vectors" or "pointers"), each of which includes the STag for the NVSSM subsystem 26 as well as the location and length of one segment in the overall read or write request. A gather list specifies one or more source memory segments from where data is to be retrieved at the source of an RDMA transfer, and a scatter list specifies one or more destination memory segments to where data is to be written at the destination of an RDMA transfer. Each entry in a scatter list or gather list includes the STag generated during initialization. However, in accordance with the technique introduced here, a single RDMA STag can be generated to specify multiple segments in different subsets of non-volatile solid-state memory in the NVSSM subsystem 26, at least some of which may have different access permissions (e.g., some may be read/write or as some may be read only). Further, a single STag that represents storage server memory can specify multiple segments in different subsets of a storage server's buffer cache 6, at least some of which may have different access permissions. Multiple segments in different subsets of a storage server buffer cache 6 may have different access permissions.

Figure 5:
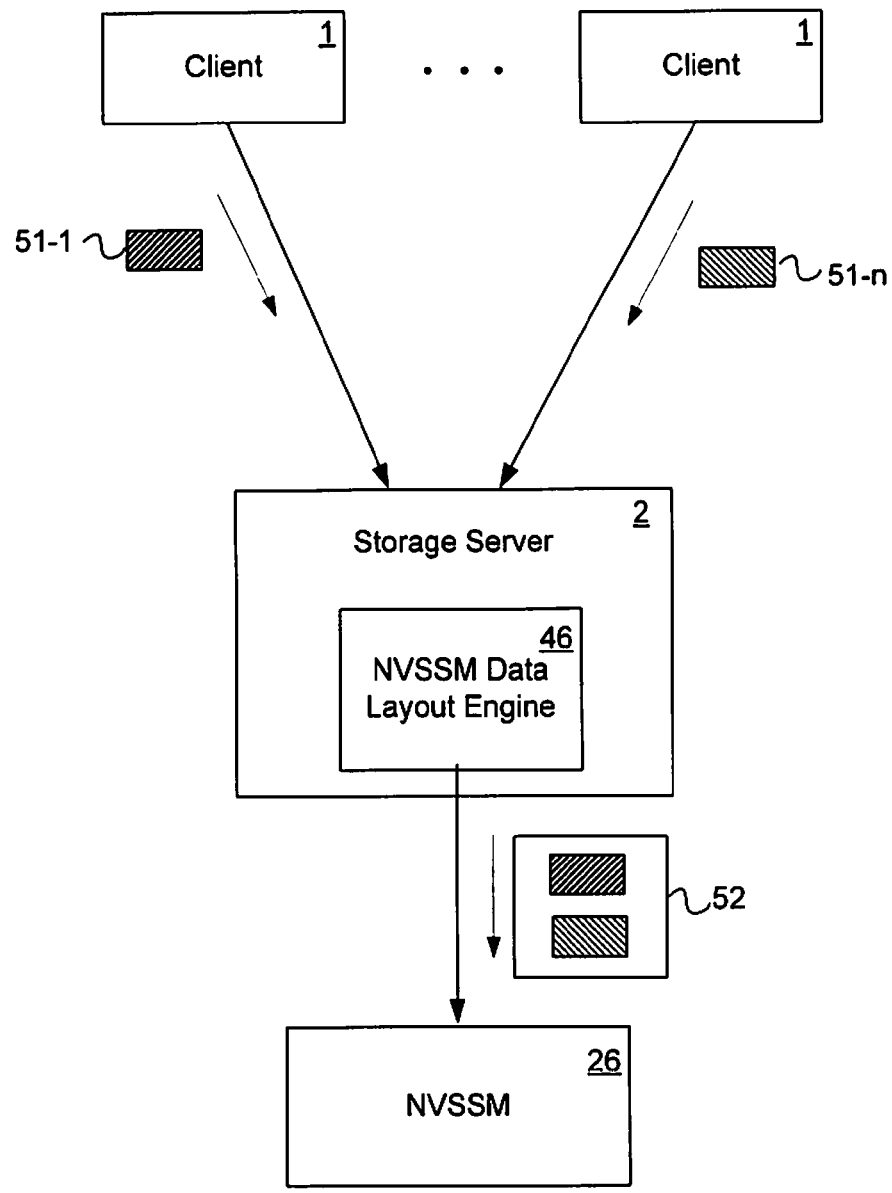
FIG. 5 illustrates how multiple client-initiated data access requests can be combined in the storage server into a single RDMA data access request.

Referring now to FIG. 5, the NVSSM data layout engine 46 can, under the direction of the storage manager 41, combine multiple client-initiated data access requests 51-1 . . . 51-*n* (read requests or write requests) into a single RDMA data access 52 (RDMA read or write). The single RDMA data access 52 includes a scatter-gather list generated by NVSSM data layout engine 46 and by storage manager 41, where data layout engine 46 generates a list for NVSSM 26 and storage manager 41 generates a list for storage server internal memory (e.g., buffer cache 6). A scatter list or a gather list can specify multiple memory segments at the source or destination (whichever is applicable). Furthermore, a scatter list or a gather list can specify memory segments that are in different subsets of memory.

In the embodiment of FIGS. 2B and 3B, the single RDMA read or write is sent to the NVSSM subsystem 26 (as shown in FIG. 5), where it decomposed by the storage RDMA controller 29 into multiple data access operations (reads or writes), which are then executed in parallel or sequentially by the storage RDMA controller 29 in the NVSSM subsystem 26. In the embodiment of FIGS. 2A and 3A, the single RDMA read or write is decomposed into multiple data access operations (reads or writes) within the storage server 2 by the host RDMA 25 controller, and these multiple operations are then executed in parallel or sequentially on the NVSSM subsystem 26 by the host RDMA 25 controller.

The storage server 2 can initiate a sequence of related RDMA reads or writes to the NVSSM subsystem 26 (where any individual RDMA read or write in the sequence can be a compound RDMA operation as described above). Thus, the storage server 2 can convert any combination of one or more client-initiated reads or writes or any other data or metadata operations into any combination of one or more RDMA reads or writes, respectively, where any of those RDMA reads or writes can be a compound read or write, respectively.

In cases where the storage server 2 initiates a sequence of related RDMA reads or writes or any other data or metadata operation to the NVSSM subsystem 26, it may be desirable to suppress completion status for all of the individual RDMA operations in the sequence except the last one. In other words, if a particular RDMA read or write is successful, then "completion" status is not generated by the NVSSM subsystem 26, unless it is the last operation in the sequence. Such suppression can be done by using conventional RDMA techniques. "Completion" status received at the storage server 2 means that the written data is in the NVSSM subsystem memory, or read data from the NVSSM subsystem is in storage server memory, for example in buffer cache 6, and valid. In contrast, "completion failure" status indicates that there was a problem executing the operation in the NVSSM subsystem 26, and, in the case of an RDMA write, that the state of the data in the NVSSM locations for the RDMA write operation is undefined, while the state of the data at the storage server from which it is written to NVSSM is still intact. Failure status for a read means that the data is still intact in the NVSSM but the status of storage server memory is undefined. Failure also invalidates the STag that was used by the RDMA operation; however, the connection between a storage server 2 and NVSSM 26 remains intact and can be used, for example, to generate new STag.

Reads or writes executed in the NVSSM subsystem 26 can also be directed to different memory devices in the NVSSM subsystem 26. For example, in certain embodiments, user data and associated resiliency metadata (e.g., RAID parity data and checksums) are stored in raw flash memory within the NVSSM subsystem 26, while associated file system metadata is stored in non-volatile DRAM within the NVSSM subsystem 26. This approach allows updates to file system metadata to be made without incurring the cost of erasing flash blocks.

Figure 6:
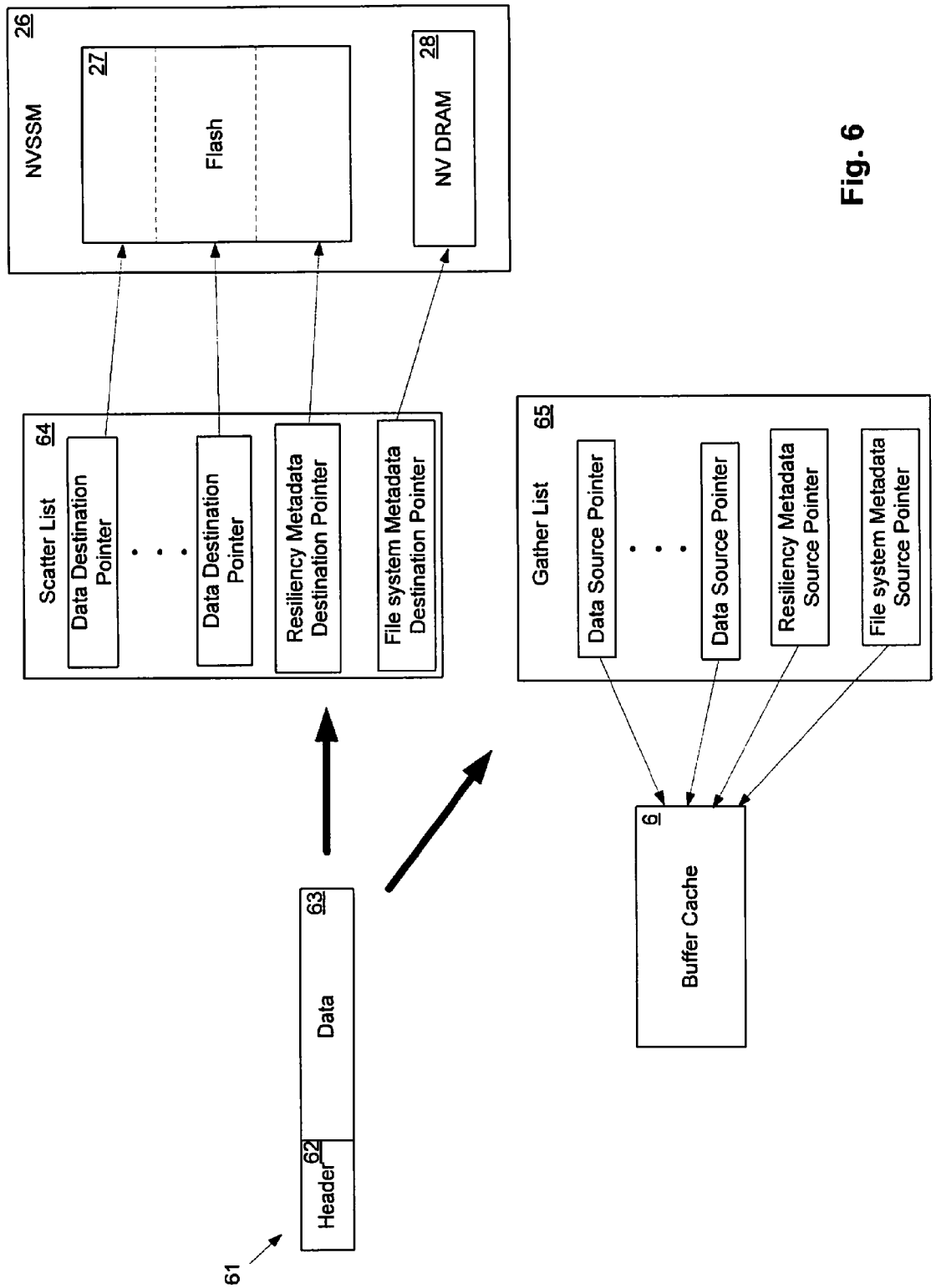
FIG. 6 illustrates an example of the relationship between a client-initiated write request and an RDMA write to the NVSSM subsystem.

This approach is illustrated in FIGS. 6 through 9. FIG. 6 shows how a gather list and scatter list can be generated based on a single client-initiated write, although in practice is likely that a scatter-gather list will reflect multiple client-initiated writes. A client-initiated write 61 received by the storage server 2 includes one or more headers 62 and write data 63 (data to be written). The client-initiated write 61 can be in any conventional format, such as an NFS write or a CIFS write.

In normal operation, the storage manager 41 in the storage server 2 buffers the write data 63 in the buffer cache 6 temporarily, and then subsequently causes the write data 63 to be copied to the PPS subsystem 4 (e.g., the NVSSM subsystem 26) at a consistency point. Either of these storage facilities may be implemented as non-volatile solid-state memory. To facilitate description, assume that the buffer cache 6 is implemented in conventional DRAM, while the PPS subsystem 4 is implemented as the NVSSM subsystem 26.

Accordingly, at a consistency point the storage manager 41 causes the NVSSM data layout manager 46 to initiate an RDMA write, to write the data 63 from the storage server buffer cache 6 into the NVSSM subsystem 26. To initiate the RDMA write, the storage manager 41 generates a gather list 65 including source pointers to the buffers in storage server buffer cache 6 where the write data 63 was placed and where storage manager 41 generated corresponding RAID metadata and file metadata, and the NVSSM data layout engine 46 generates a corresponding scatter list 64 including destination pointers to where the data 63 and corresponding RAID metadata and file metadata shall be placed at NVSSM 26. In the case of an RDMA write, the gather list 65 specifies the memory locations in the buffer cache 6 from where to retrieve the data to be transferred, while the scatter list 64 specifies the memory locations in the NVSSM subsystem 26 into which the data is to be written. By specifying multiple destination memory locations, the scatter list 64 specifies multiple individual write accesses to be performed in the NVSSM subsystem 26.

The scatter-gather list 64, 65 can also include pointers for resiliency metadata generated by the storage operating system 40, such as RAID metadata, parity, checksums, etc. The gather list 65 includes source pointers that specify where such metadata is to be retrieved from in the buffer cache 6, and the scatter list 64 includes destination pointers that specify where such metadata is to be written to in the NVSSM subsystem 26. In the same way, the scatter-gather list 64, 65 can further include pointers for basic file system metadata 67, which specifies the NVSSM blocks where file data and resiliency metadata are written in NVSSM (so that the file data and resiliency metadata can be found by reading file system metadata). As shown in FIG. 6, the scatter list 64 can be generated so as to direct the write data and the resiliency metadata to be stored to flash memory 27 and the file system metadata to be stored to non-volatile DRAM 28 in the NVSSM subsystem 26. As noted above, this distribution of metadata storage allows certain metadata updates to be made without requiring erasure of flash blocks, which is particularly beneficial for frequently updated metadata. Note that some file system metadata may also be stored in flash memory 27, such as less frequently updated file system metadata. Further, the write data and the resiliency metadata may be stored to different flash devices or different subsets of the flash memory 27 in the NVSSM subsystem 26.

Figure 7:
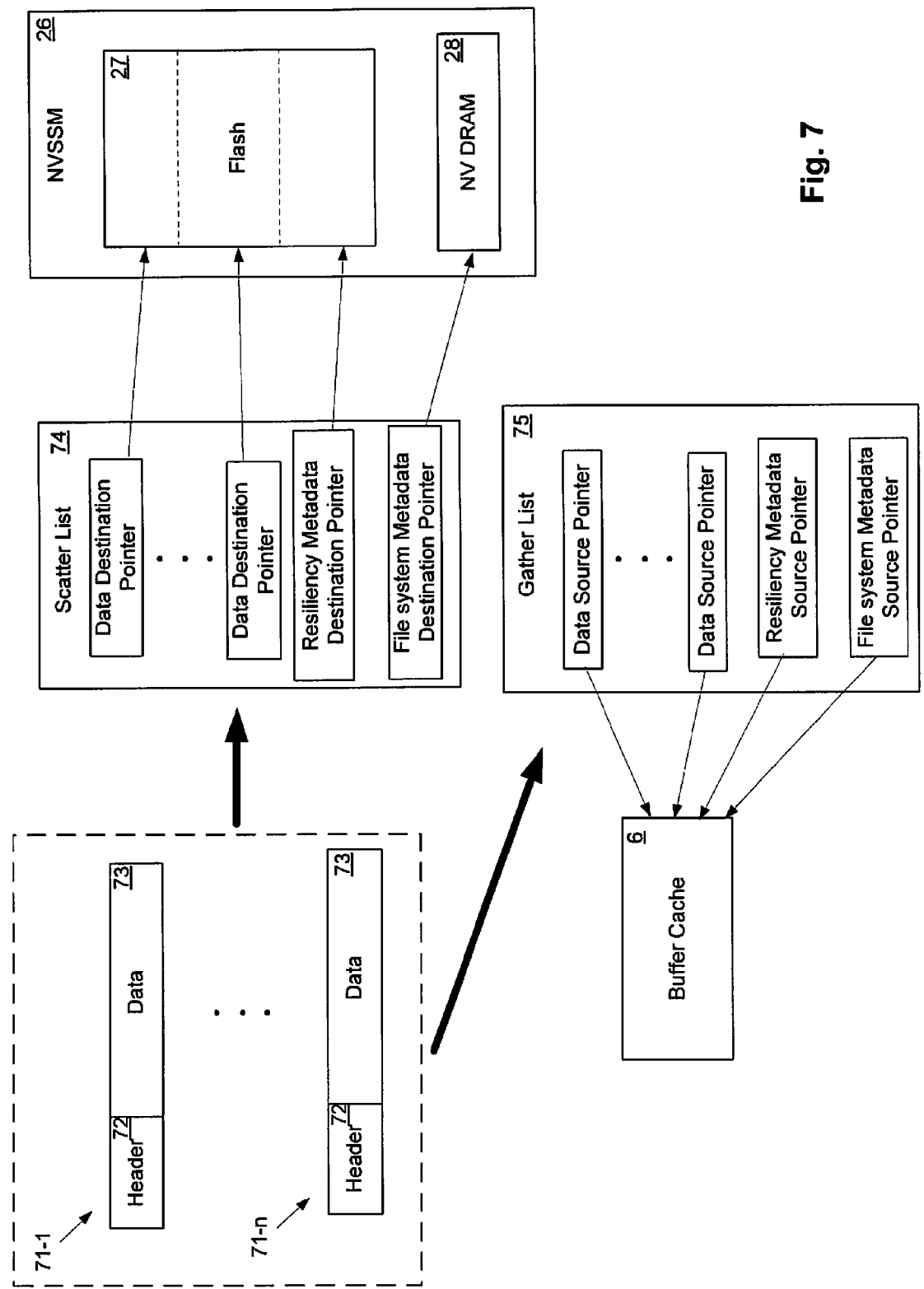
FIG. 7 illustrates an example of the relationship between multiple client-initiated write requests and an RDMA write to the NVSSM subsystem.

FIG. 7 illustrates how multiple client-initiated writes can be combined into a single RDMA write. In a manner similar to that discussed for FIG. 6, multiple client-initiated writes 71-1 ... 71-n can be represented in a single gather list and a corresponding single scatter list 74, to form a single RDMA write. Write data 73 and metadata can be distributed in the same manner discussed above in connection with FIG. 6.

Figure 8:
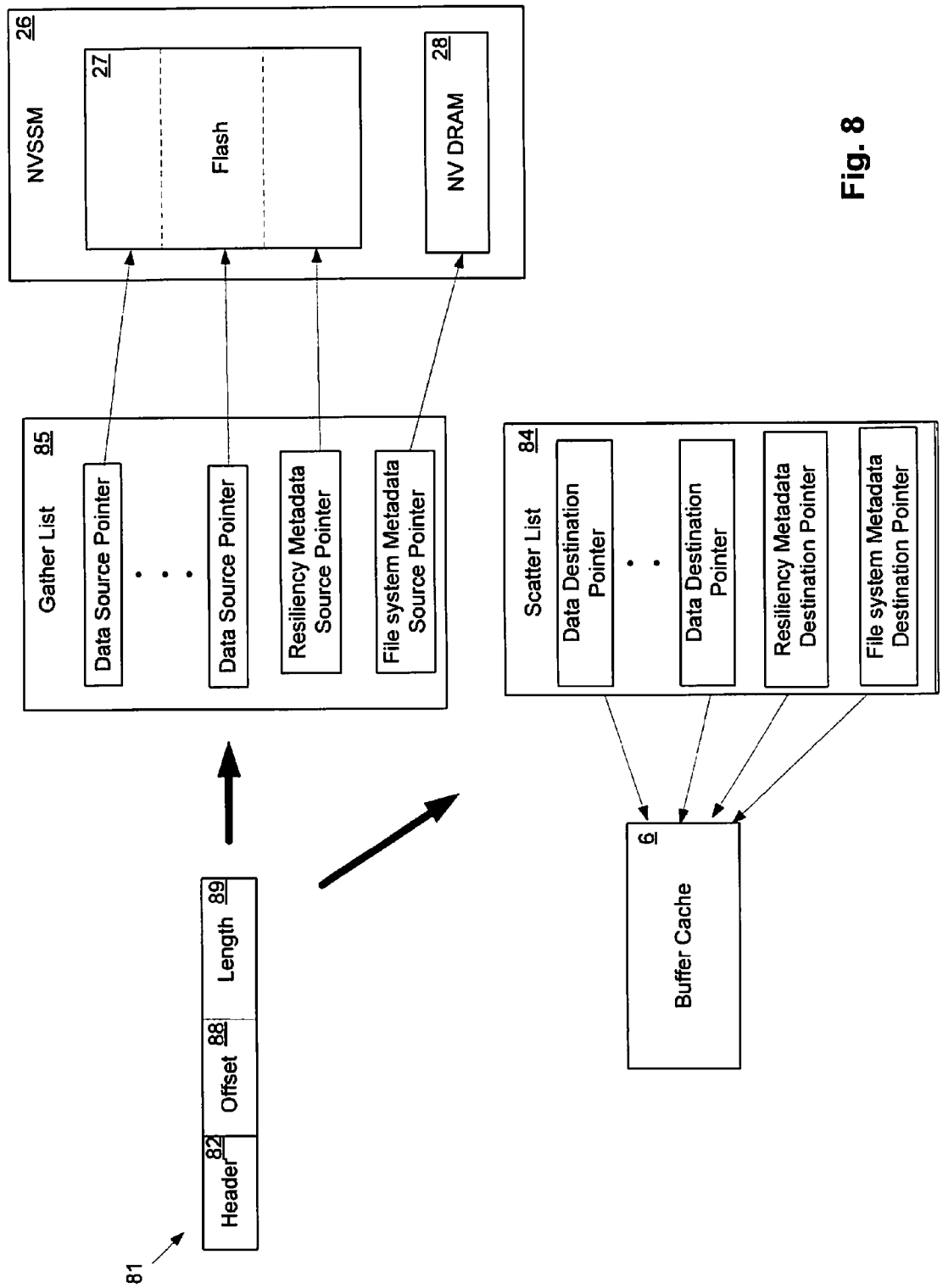
FIG. 8 illustrates an example of the relationship between a client-initiated read request and an RDMA read to the NVSSM subsystem.

FIG. 8 shows how an RDMA read can be generated based on a client-initiated read request. Note that an RDMA read can reflect multiple client-initiated read requests, as discussed below. A client-initiated read request 81 received by the storage server 2, in one embodiment, includes a header 82, a starting offset 88 and a length 89 of the requested data The client-initiated read request 81 can be in any conventional format, such as an NFS read or a CIFS read.

If the requested data resides in the NVSSM subsystem 26, the NVSSM data layout manager 46 generates a gather list 85 for NVSSM subsystem 26 and the storage manager 41 generates a corresponding scatter list 84 for buffer cache 6, first to retrieve file metadata. In one embodiment, the file metadata is retrieved from the NVSSM's DRAM 28. In one RDMA read, file metadata can be retrieved for multiple file systems and for multiple files and directories in a file system. Based on the retrieved file metadata, a second RDMA read can then be issued, with storage manager 41 specifying a scatter list and NVSSM data layout manager 46 specifying a gather list for the requested read data. In the case of an RDMA read, the gather list 85 specifies the memory locations in the NVSSM subsystem 26 from which to retrieve the data to be transferred, while the scatter list 84 specifies the memory locations in the buffer cache 6 into which the data is to be written. By specifying multiple source memory locations, the gather list 85 can specify multiple individual read accesses to be performed in the NVSSM subsystem 26.

The gather list 85 also specifies memory locations from which file system metadata for the first RDMA read and resiliency (e.g., RAID metadata, checksums, etc.) and file system metadata for the second RDMA read are to be retrieved in the NVSSM subsystem 29. As indicated above, these various different types of data and metadata can be retrieved from different locations in the NVSSM subsystem 26, including different types of memory (e.g. flash 27 and non-volatile DRAM 28).

Figure 9:
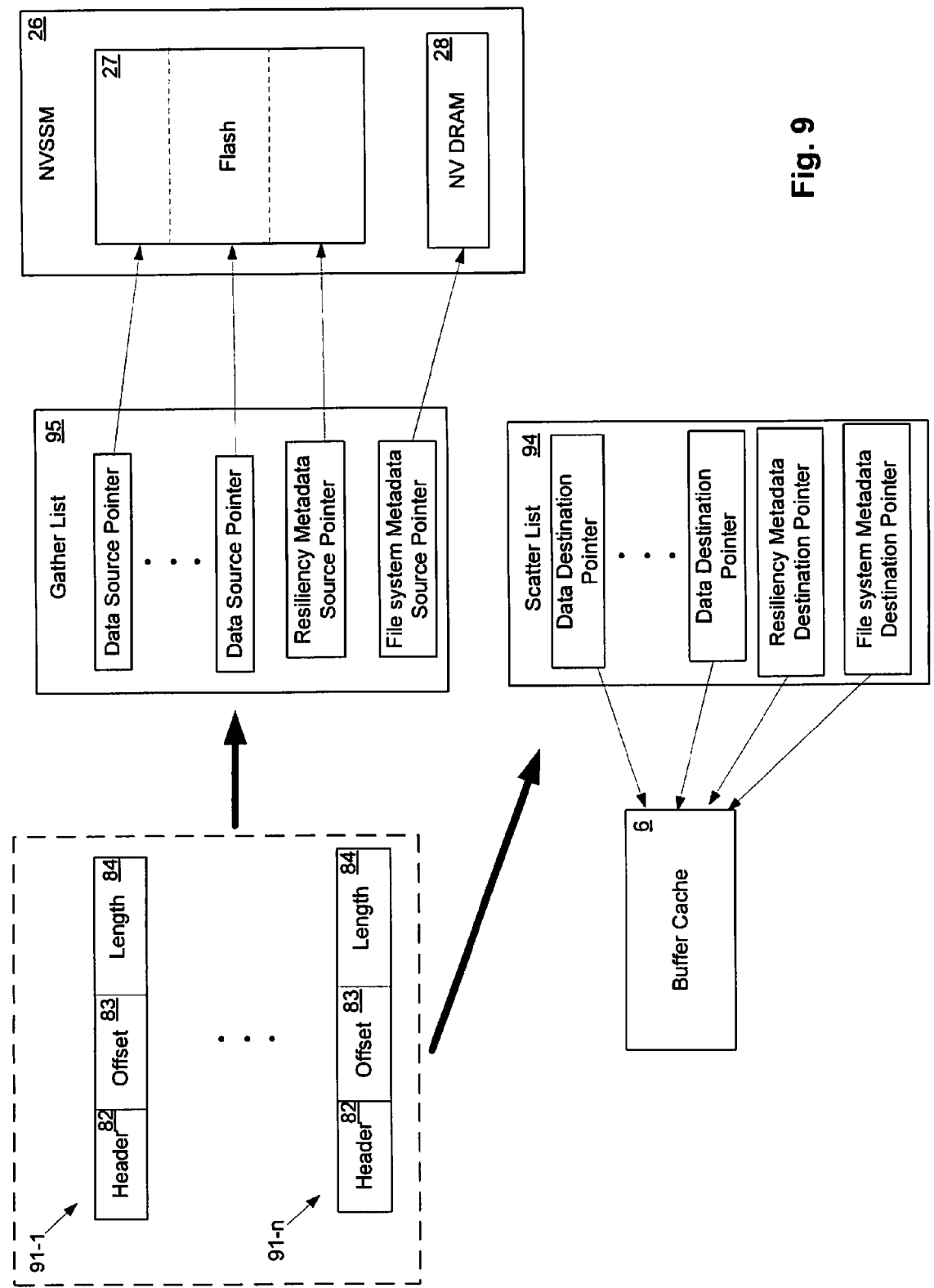
FIG. 9 illustrates an example of the relationship between multiple client-initiated read requests and an RDMA read to the NVSSM subsystem.

FIG. 9 illustrates how multiple client-initiated reads can be combined into a single RDMA read. In a manner similar to that discussed for FIG. 8, multiple client-initiated read requests 91-1 ... 91-n can be represented in a single gather list 95 and a corresponding single scatter list 94 to form a single RDMA read for data and RAID metadata, and another single RDMA read for file system metadata. Metadata and read data can be gathered from different locations and/or memory devices in the NVSSM subsystem 26, as discussed above.

Note that one benefit of using the RDMA semantic is that even for data block updates there is a potential performance gain. For example, referring to FIG. 2B, blocks that are to be updated can be read into the storage server 2 memory, updated by the storage manager 41 based on the RDMA write data, and then written back to the NVSSM subsystem 26. In one embodiment the data and metadata are written back to the NVSSM blocks from which they were taken. In another embodiment, the data and metadata are written into different blocks in the NVSSM subsystem and 26 and file metadata pointing to the old metadata locations is updated. Thus, only the modified data needs to cross the bus structure within the storage server 2, while much larger flash block data does not.

Figure 10A:
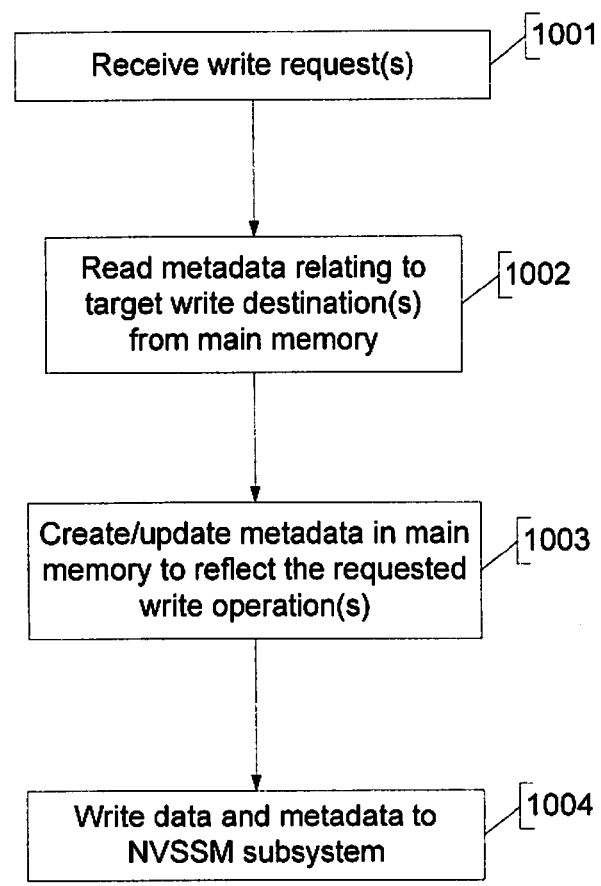
FIGS. 10A and 10B are flow diagrams showing a process of executing an RDMA write to transfer data from memory in the storage server to memory in the NVSSM subsystem.
Figure 10B:
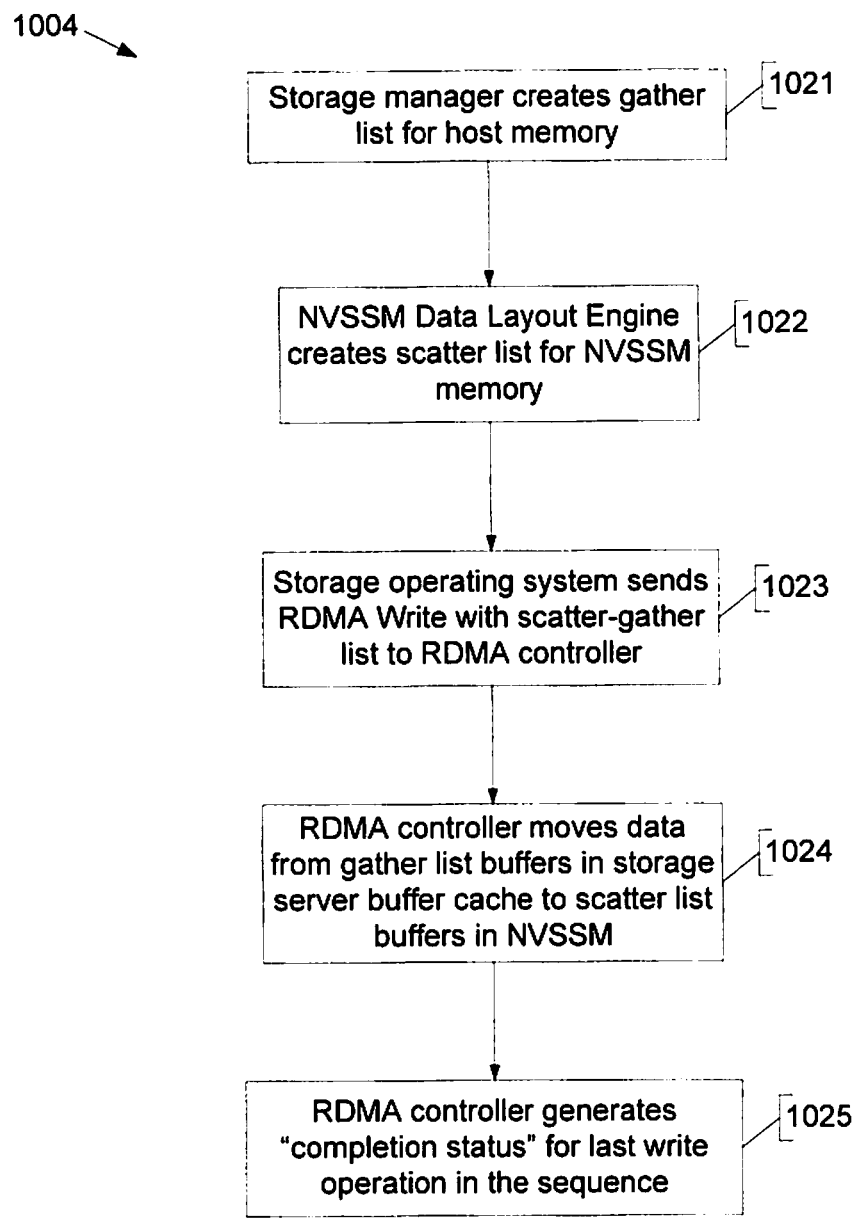

FIGS. 10A and 10B illustrate an example of a write process. FIG. 10A illustrates the overall process, while FIG. 10B illustrates a portion of that process in greater detail. Referring first to FIG. 10A, initially the storage server 2 receives one or more write requests at 1001. As noted above, multiple write requests can be combined into a single (compound) RDMA write. The storage manager 41 (FIG. 4) in the storage server 2 then reads metadata relating to the target destinations for the write data (e.g., the volume(s) and directory or directories where the data is to be written) at 1002. The storage manager 41 then creates and/or updates metadata in main memory to reflect the requested write operation(s) at 1003. At 1004 the storage operating system causes data and associated metadata to be written to the NVSSM subsystem 26.

FIG. 10B shows in greater detail an example of operation 1004, i.e., the process of executing an RDMA write to transfer data and metadata from memory in the storage server 2 to memory in the NVSSM subsystem 26. Initially, at 1021 the storage manager 41 creates a gather list specifying the locations in host memory (e.g., in buffer cache 6) where the data and metadata to be transferred reside. At 1022 the NVSSM data layout engine 46 (FIG. 4) creates a scatter list for the locations in the NVSSM subsystem 26 to which the data and metadata are to be written. At 1023 the storage operating system 40 sends an RDMA Write operation with the scatter-gather list to the RDMA controller (which in the embodiment of FIGS. 2A and 3A is the host RDMA controller 25 or in the embodiment of FIGS. 2B and 3B is the storage RDMA controller 29). At 1024 the RDMA controller moves data and metadata from the buffers in buffer cache 6 specified by the gather list to the buffers in NVSSM memory specified by the scatter list. This operation can be a compound RDMA write, executed as multiple individual writes at the NVSSM subsystem 26, as described above. At 1025, the RDMA controller sends a "completion" status message to the storage operating system 40 for the last write operation in the sequence (assuming a compound RDMA write), to complete the process. In another embodiment a sequence of RDMA write operations 1004 is generated by the storage controller 2. For such an embodiment the completion status is generated only for the last RDMA write operation in the sequence if all previous write operations in the sequence are successful.

Figure 11A:
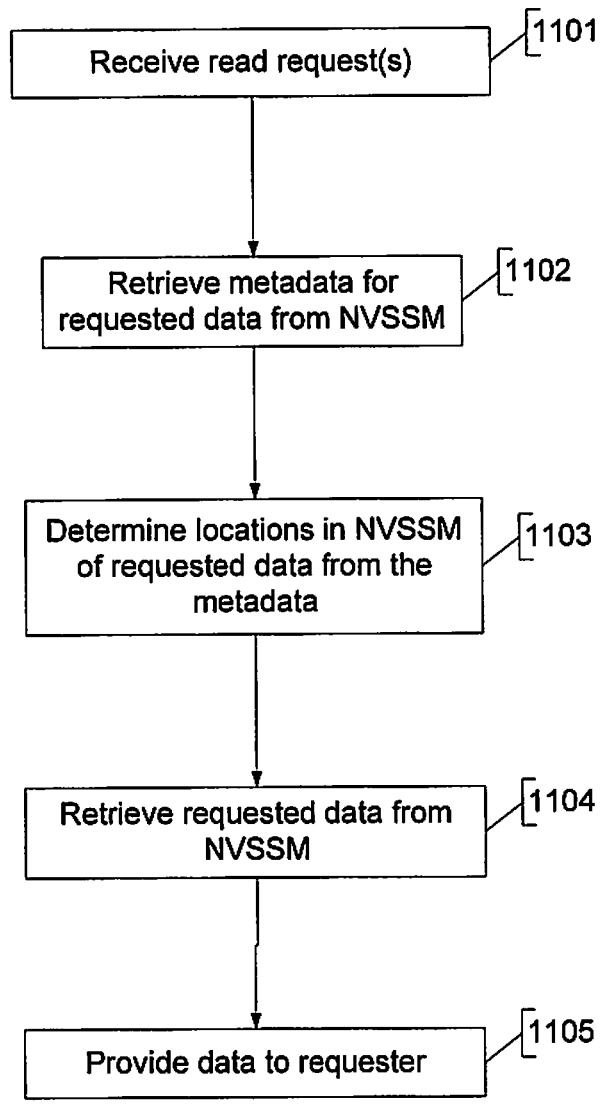
FIGS. 11A and 11B are flow diagrams showing a process of executing an RDMA read to transfer data from memory in the NVSSM subsystem to memory in the storage server.
Figure 11B:
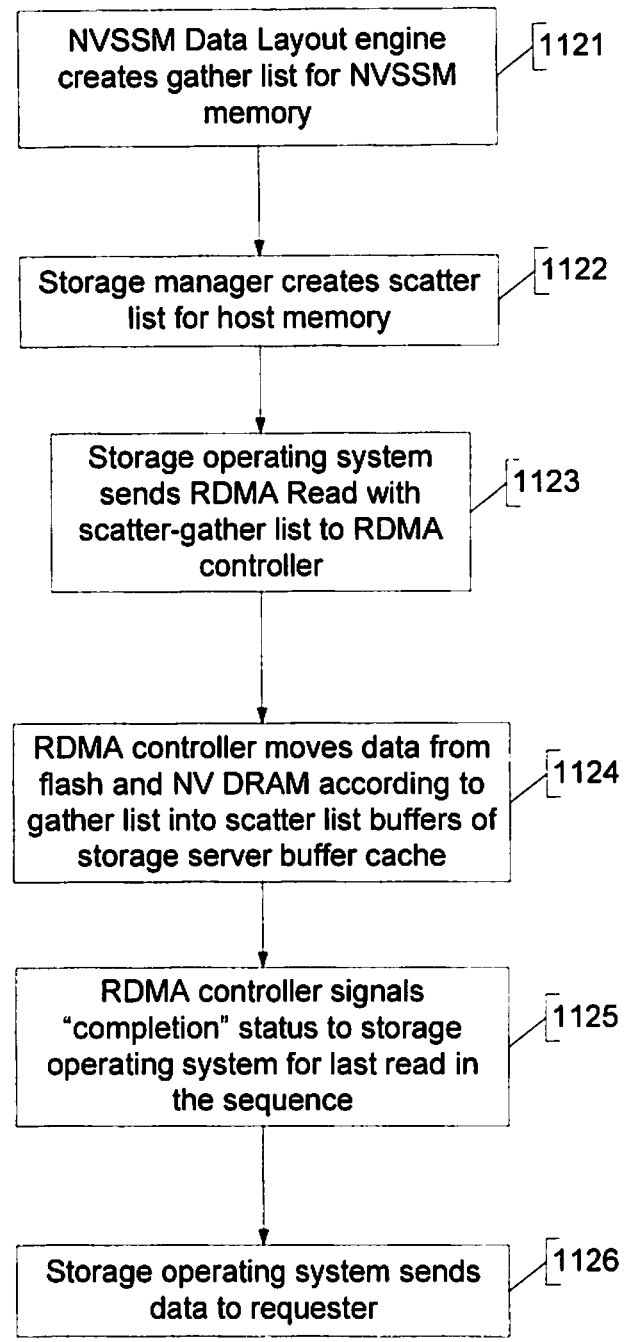

FIGS. 11A and 11B illustrate an example of a read process. FIG. 11A illustrates the overall process, while FIG. 11B illustrates portions of that process in greater detail. Referring first to FIG. 11A, initially the storage server 2 receives one or more read requests at 1101. As noted above, multiple read requests can be combined into a single (compound) RDMA read. At 1102 the storage operating system 40 in the storage server 2 retrieves file system metadata relating to the requested data from the NVSSM subsystem 26; this operation can include a compound RDMA read, as described above. This file system metadata is then used to determine the locations of the requested data in the NVSSM subsystem at 1103. At 1104 the storage operating system 40 retrieves the requested data from those locations in the NVSSM subsystem at 1104; this operation also can include a compound RDMA read. At 1105 the storage operating system 40 provides the retrieved data to the requester.

FIG. 11B shows in greater detail an example of operation 1102 or operation 1104, i.e., the process of executing an RDMA read, to transfer data or metadata from memory in the NVSSM subsystem 26 to memory in the storage server 2. In the read case, the storage server 2 first reads metadata for the target data, and then reads the target data based on the metadata, as described above in relation to FIG. 11A. Accordingly, the following process actually occurs twice in the overall process, first for the metadata and then for the actual target data. To simplify explanation, the following description only refers to "data", although it will be understood that the process can also be applied in essentially the same manner to read metadata.

Initially, at 1121 the NVSSM data layout engine 46 creates a gather list specifying locations in the NVSSM subsystem 26 where the data to be read resides. At 1122 the storage manager 41 creates a scatter list specifying locations in host memory to which the read data is to be written. At 1123 the storage operating system 40 sends an RDMA Read operation with the scatter-gather list to the RDMA controller (which in the embodiment of FIGS. 2A and 3A is the host RDMA controller 25 or in the embodiment of FIGS. 2B and 3B is the storage RDMA controller 29). At 1124 the RDMA controller moves data from flash memory and non-volatile DRAM 28 in the NVSSM subsystem 26 according to the gather list, into scatter list buffers of the storage server buffer cache 6. This operation can be a compound RDMA read, executed as multiple individual reads at the NVSSM subsystem 26, as described above. At 1125 the RDMA controller signals "completion" status to the storage operating system 40 for the last read in the sequence (assuming a compound RDMA read). In another embodiment a sequence of RDMA read operations 1102 or 1104 is generated by the storage controller. For such an embodiment the completion status is generated only for the last RDMA Read operation in the sequence if all previous read operations in the sequence are successful. The storage operating system then sends the requested data to the requester at 1126, to complete the process.

Thus, a method and apparatus for facilitating the use of flash memory in a network storage system have been described.

The methods and processes introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
temporarily storing, by a network storage controller, write data associated with a conventional data write request on a temporary memory in the network storage controller, wherein the conventional data write request is initiated by a remote client device, and the conventional data write is one of a Network File System (NFS) request or a Common Internet File System (CIFS) request;
generating, by the network storage controller, a scatter-gather list associated with the data write request; and
converting, by the network storage controller, the conventional client-initiated data write request into a compound remote direct memory access (RDMA) operation including the scatter-gather list, an independent data write operation, and various independent metadata operations,
wherein, when initiated by the network storage controller, the RDMA operation transfers data over a serial interface from the temporary memory to an external non-volatile solid-state memory (NVSSM) subsystem according to the scatter-gather list, and
wherein the scatter-gather list indicates multiple source memory locations in the temporary memory associated with the data write request and multiple corresponding destination memory locations in the NVSSM subsystem, the multiple destination memory locations including a memory location for the write data and a first type of metadata on a first type of memory of the NVSSM subsystem and a memory location for a second type of metadata on a second type of memory of the NVSSM subsystem, and
wherein the first type of metadata is different than the second type of metadata and the first type of memory is different than the second type of memory.

2. The method of claim 1, wherein, when initiated by the network storage controller, the RDMA operation transfers data over the serial interface from the temporary memory to the NVSSM subsystem according to the scatter-gather list including:
transferring the data associated with the client-initiated data write request and the first type of metadata to the first type of memory of the NVSSM subsystem for storage, and
transferring the second type of metadata to the second type of memory of the NVSSM subsystem for storage.

3. The method of claim 1, further comprising:
transferring the compound RDMA operation when initiated by the network storage controller,
wherein the RDMA operation is configured to be decomposed and executed as multiple parallel operations at the NVSSM subsystem.

4. The method of claim 1, further comprising:
transferring the compound RDMA operation when initiated by the network storage controller,
wherein the RDMA operation is configured to be decomposed and executed as multiple serial operations at the NVSSM subsystem.

5. The method of claim 1, wherein the first type of memory comprises flash memory and the second type of memory comprises a non-volatile random access memory.

6. The method of claim 1, further comprising:
generating, by the network storage controller, the first type of metadata and the second type of metadata,
wherein the first type of metadata comprises resiliency metadata for the write data, and
wherein the second type of metadata comprises file system metadata associated with the write data.

7. The method of claim 6, wherein the transfer of data over the serial interface from the temporary memory to the NVSSM subsystem according to the scatter-gather list updates the file system metadata without incurring the cost of erasing flash.

8. A method, comprising:
receiving, by a network storage controller, multiple conventional data access requests initiated by one or more remote client devices, the conventional data access requests being one or more of Network File System (NFS) requests or Common Internet File System (CIFS) requests;
storing data associated with the multiple conventional data access requests on a temporary memory in the network storage controller;
generating, by the network storage controller, a scatter-gather list associated with the multiple data access requests,
wherein the scatter-gather list indicates multiple memory locations in the temporary memory associated with the data access requests and multiple corresponding memory locations in the external NVSSM subsystem, and
wherein the multiple memory locations include memory locations for the data associated with the data access requests and a first type of metadata on a first type of memory of the NVSSM subsystem and memory locations for a second type of metadata on a second type of memory of the NVSSM subsystem, and
wherein the first type of metadata is different than the second type of metadata; and
converting, by the network storage controller, the multiple client-initiated data access requests into a compound remote direct memory access (RDMA) operation including the scatter-gather list and various independent data access and metadata operations; and
transferring the compound RDMA operation over a serial interface between the temporary memory and an external non-volatile solid-state memory (NVSSM) subsystem according to the scatter-gather list.

9. The method of claim 8, wherein the data access requests comprise data write requests, and wherein transferring the compound RDMA operation according to the scatter-gather list includes:
transferring the data associated with the client-initiated access requests and a the first type of metadata to the first type of memory of the NVSSM subsystem for storage, and
transferring the second type of metadata to the second type of memory of the NVSSM subsystem for storage.

10. The method of claim 8, wherein converting the multiple client-initiated data access requests into the compound RDMA operation includes combining multiple read requests or write request into a single RDMA operation.

11. The method of claim 8, wherein the RDMA operation is configured to be decomposed and executed as multiple parallel operations at the NVSSM subsystem.

12. The method of claim 8, wherein the RDMA operation is configured to be decomposed and executed as multiple serial operations at the NVSSM subsystem.

13. The method of claim 8, wherein the first type of memory comprises flash memory and the second type of memory comprises a non-volatile random access memory, and wherein the first type of metadata comprises resiliency metadata and the second type of metadata comprises file system metadata.

14. The method of claim 13, wherein the transfer of data over the serial interface from the temporary memory to the NVSSM subsystem according to the scatter-gather list updates the file system metadata without incurring the cost of erasing flash.

15. The method of claim 8, further comprising:
responsive to transferring the compound RDMA operation, receiving a single completion status for the multiple conventional data access requests.

16. A network storage system, comprising:
a network interface through which to receive conventional client-initiated data access requests initiated by one or more remote client systems over an external network, wherein the conventional data access requests are one or more of Network File System (NFS) requests or Common Internet File System (CIFS) requests;
a serial storage interface through which to access an external non-volatile solid-state memory (NVSSM) subsystem;
a cache system configured to temporarily store data associated with the conventional data access requests;
a network storage controller configured to generate a scatter-gather list associated with the data access requests,
wherein the scatter-gather list indicates multiple memory locations in the temporary memory associated with the data access requests and multiple corresponding memory locations in the external NVSSM subsystem, wherein the multiple memory locations include memory locations for the data associated with the data access requests and a first type of metadata on a first type of memory of the NVSSM subsystem and memory locations for a second different type of metadata on a second different type of memory of the NVSSM subsystem;

a remote direct memory access (RDMA) controller in communication with the data layout engine and the cache system and configured to:
convert the multiple conventional client-initiated data access requests into a compound RDMA operation including the scatter-gather list and various independent data access and metadata operations, and
direct transfer of the RDMA operation over the serial storage interface between the temporary memory and the external NVSSM subsystem according to the scatter-gather list.

17. The network storage system of claim 16, wherein directing transfer of the compound RDMA operation according to the scatter-gather list includes:
directing transfer of the data associated with the client-initiated access requests and a the first type of metadata to the first type of memory of the NVSSM subsystem for storage, and
directing transfer of the second type of metadata to the second type of memory of the NVSSM subsystem for storage.

18. The network storage system of claim 16, wherein converting the multiple client-initiated data access requests into the compound RDMA operation includes combining multiple read requests or write request into a single RDMA operation.

19. The network storage system of claim 16, further comprising:
the NVSSM subsystem including the first type of memory configured to store data associated with the multiple data access requests and the first type of metadata, and
the second type of memory configured to store the second type of metadata.

20. The network storage system of claim 16, wherein the NVSSM subsystem is configured to:
receive the compound RDMA operation initiated by the network storage controller;
decompose the RDMA operation; and
execute the RDMA operation as multiple parallel operations at the NVSSM subsystem.

21. The network storage system of claim 20, wherein the NVSSM subsystem is further configured to:
receive multiple RDMA operations;
suppress completion status indications for the multiple RDMA operations; and
generate a single completion status indication for the multiple RDMA operations.

* * * * *